May 17, 1927.
J. B. HENDERSON
SIGHTING DEVICE
Filed July 26, 1919
1,628,776
4 Sheets-Sheet 1
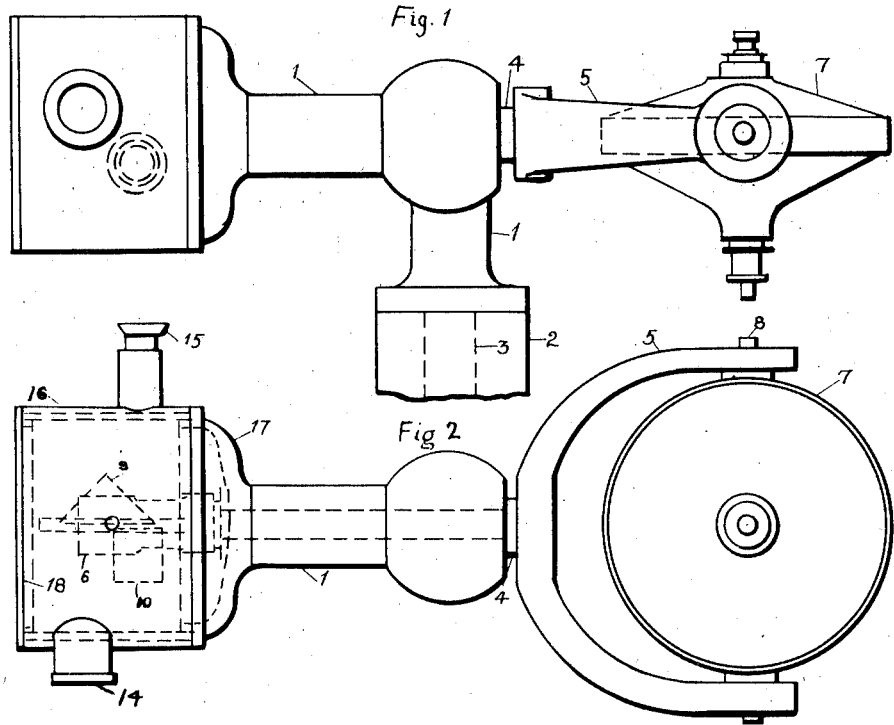
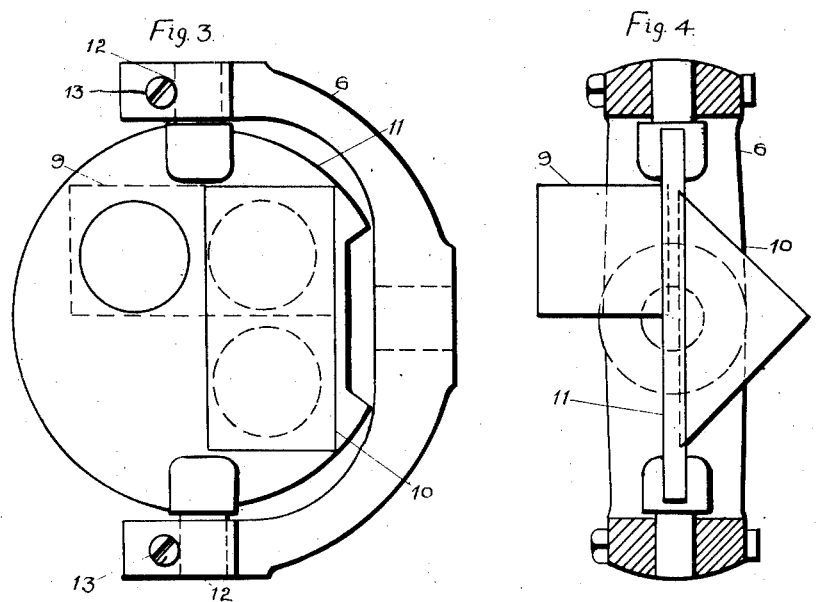
INVENTOR
James Blacklock Henderson

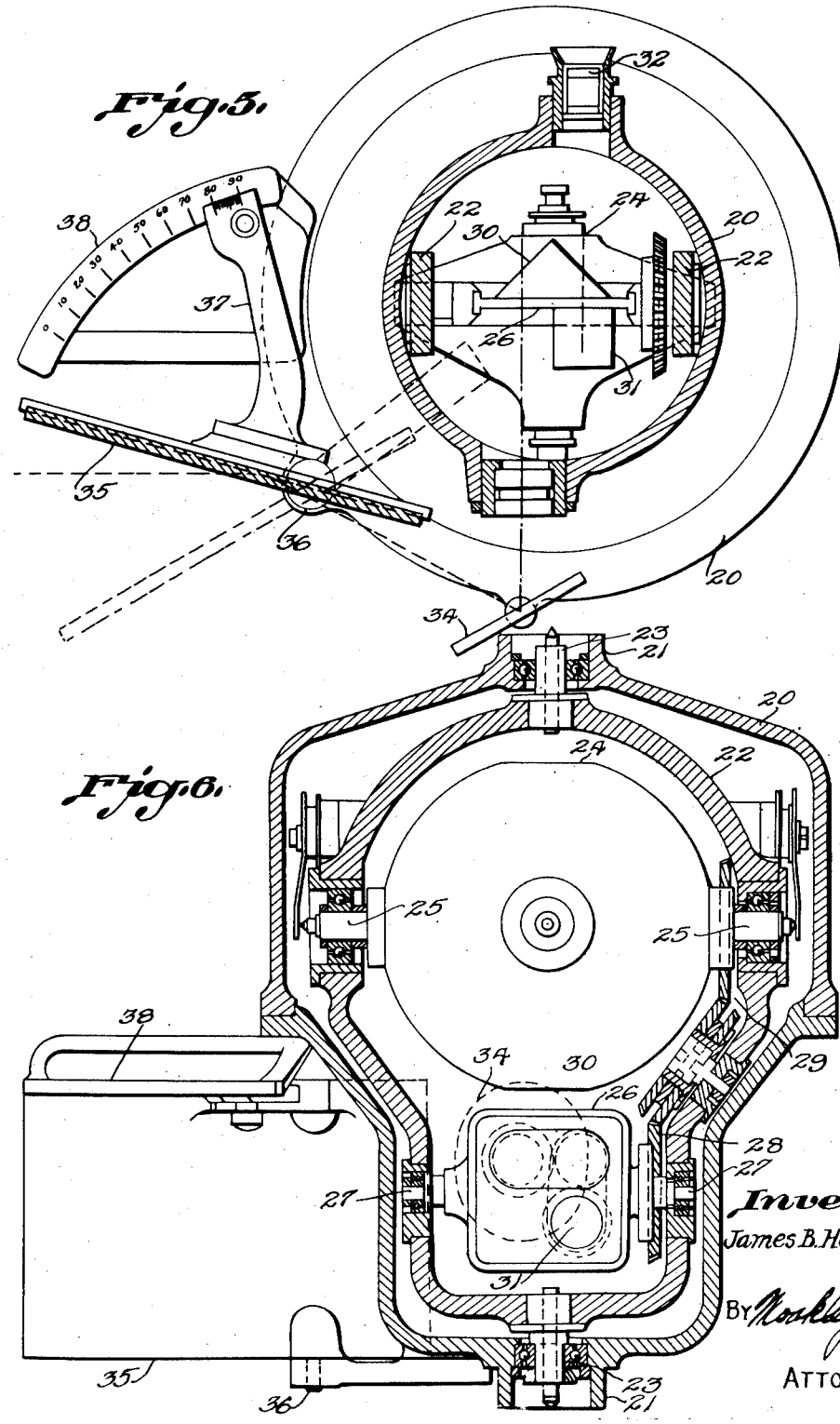

May 17, 1927.
J. B. HENDERSON
SIGHTING DEVICE
Filed July 26, 1919
1,628,776
4 Sheets-Sheet 4
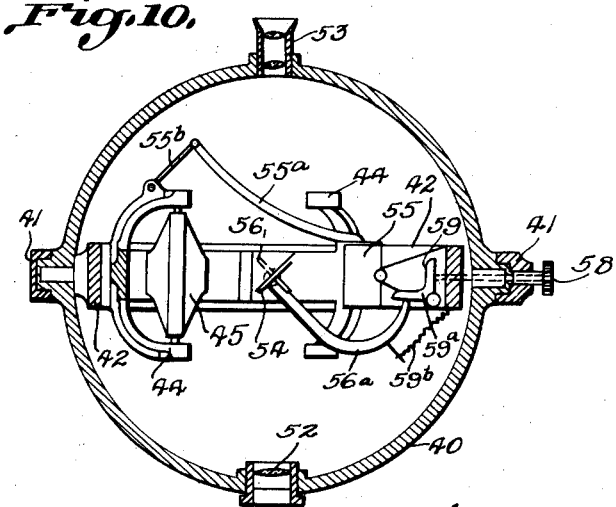
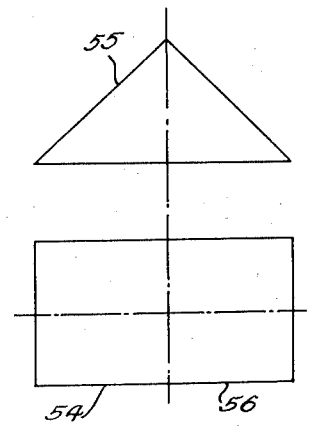
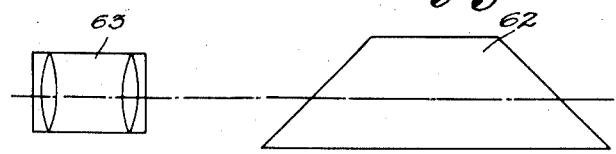
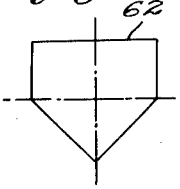
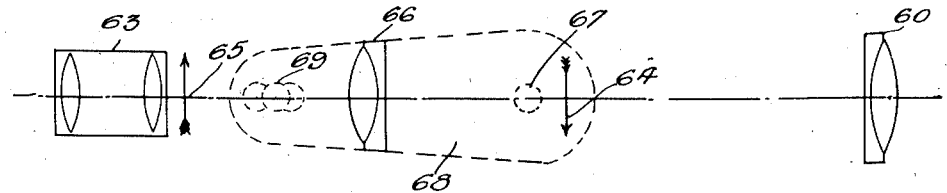
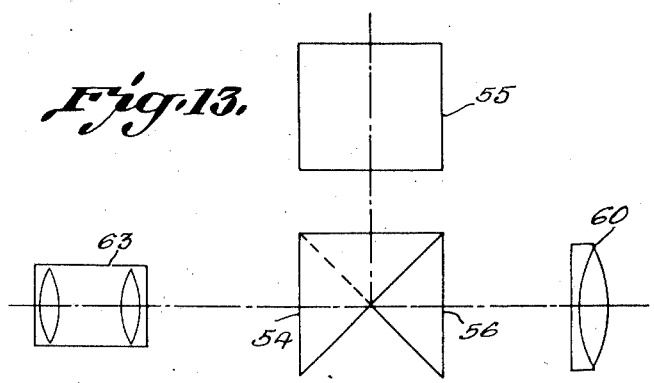
Inventor
James B. Henderson
BY Moakley & Gill
ATTORNEYS Patented May 17, 1927.

1,628,776

UNITED STATES PATENT OFFICE.

JAMES BLACKLOCK HENDERSON, OF LEE, ENGLAND.

SIGHTING DEVICE.

Application filed July 26, 1919, Serial No. 313,535, and in Great Britain May 10, 1915.

(GRANTED UNDER THE PROVISIONS OF THE ACT OF MARCH 3, 1921, 41 STAT. L., 1313.)

The object of my invention is to provide a telescope or camera for use on board a ship, aeroplane or other oscillating body, in which although the heavy parts of the telescope or camera are mounted so that they partake of the angular motion of the ship or aeroplane nevertheless the image of the object sighted by the telescope or camera remains stationary on the cross wires notwithstanding the oscillatory motion. I may also arrange the telescope with gravitational stability so that the view in the telescope is either that vertically under the aeroplane or one that subtends a definite angle with the vertical. For example on board ship it may be a horizontal view which is wanted in the field of view.

To carry my invention into effect I make the telescope of the prismatic type and I mount the telescope case carrying the objective and eyepiece on the aeroplane or other moving platform so that it partakes of the rocking motion of the platform. I mount the prisms of the telescope on a gimbal ring, the axis of which is preferably parallel to the axis of the telescope, the two gimbal axes being mutually perpendicular to each other and to the axis of the telescope. I arrange the point of intersection of the gimbal axes to be midway between the optical centre of the objective and the centre of the focal plane. I may arrange the gimbal ring to have gravitational stability about both gimbal axes or I may arrange it only to have gravitational stability about one of these axes depending on the purpose for which the telescope is intended. I may lengthen the period of pendular oscillation of the gimbal ring by means of moments of inertia or by means of a gyroscope or gyroscopes. I may use one gyroscope attached to the gimbal ring with its rotor axis perpendicular to the gimbal axes, or when it is desirable that the gyroscopic constraint about one gimbal axis shall not affect the setting about the other gimbal axis I may employ the well-known combination of two constrained gyroscopes to lengthen the period of oscillation of the gimbal ring about each of its gimbal axes. As an alternative I may employ a combination of three gyroscopes at 120° to each other.

I may provide a hand adjustment of the telescope case on the moving platform and to change the bearing of the telescope relatively to the vertical I may alter the setting of the telescope case by means of the hand adjustment and then rotate the gimbal ring, which carries the prisms, relatively to the vertical, by altering the position of the weight which imparts the gravitational stability to the ring, or I may employ optical means outside or inside the telescope. For small angles I may employ a refracting prism of small angle which I translate along the axis of collimation of the telescope. For large angles I may employ two mirrors outside the telescope, the image formed by double reflection in the mirrors being viewed by the telescope and the angle between the mirrors being adjustable.

In some cases as in gun sighting telescopes it may be only necessary to eliminate the angular motion of the ship or oscillating platform in one plane, say only the rolling of the ship. In such cases I may attach the prisms to the outer gimbal axis or I may separate the prism combination into its two right angled prisms or their equivalents one of which I attach to the outer gimbal axis while the other I attach to the telescope case, for example I may fix the prism having its right angled edge vertical to the gimbal axis, and the prism having its right angled edge horizontal to the telescope case, so that it moves with the ship. In such an arrangement I conveniently design the adjustment of the telescope for elevation or for deviation of the gyroscopic pendulum from the vertical, by translating the prism which moves with the ship up and down relatively to the lenses. When only one prism is stabilized, the objective and the focal plane must be equi-distant from the reflecting edge of the unstabilized prism which in its normal position must also intercept the gimbal axis.

The image on the focal plane of the telescope may be enlarged for photographic purposes by means of a suitable combination of lenses in the eyepiece of the telescope to which the camera may be rigidly attached.

In cases in which it is required to direct a telescope at a given angle from the vertical with great accuracy as in bomb-dropping from aeroplanes it may be desirable to know at any time the deviation of the gyroscopic pendulum from the vertical and to allow for such deviation. In such cases I may arrange two telescopes with their prisms on the one gimbal ring, both stabilized by the same gyro pendulum. One of them is the directing telescope while the other being directed at the horizon gives the deviation of the gyropendulum. The focal planes of these two telescopes may be placed side by side or one over the other so as to be visible through the one eyepiece or the two telescopes may be arranged with their eyepieces side by side conveniently for use with the two eyes.

In the accompanying drawings which illustrate my invention:—

Figs. 1 and 2 show elevation and plan of one arrangement of telescope which might be used say to annul the effects of the rolling of a ship.

Figs. 3 and 4 show two views of the optical parts of the same telescope,

Figure 7:
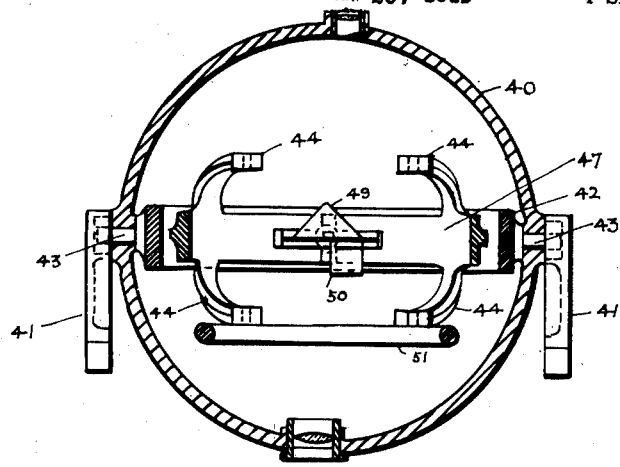
Figure 8:
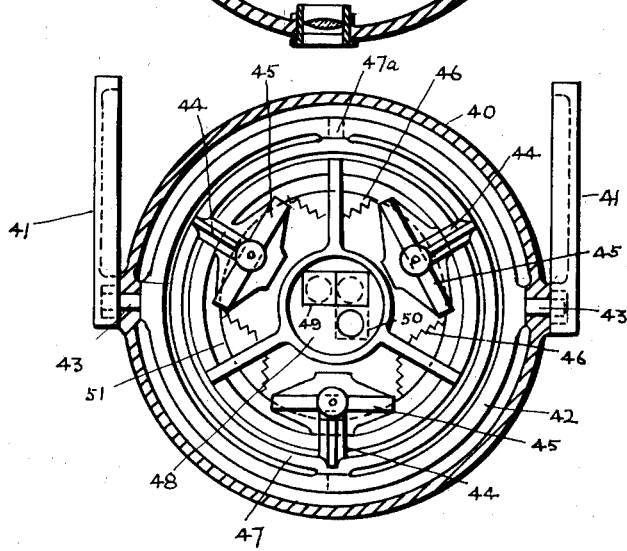
Figure 9:
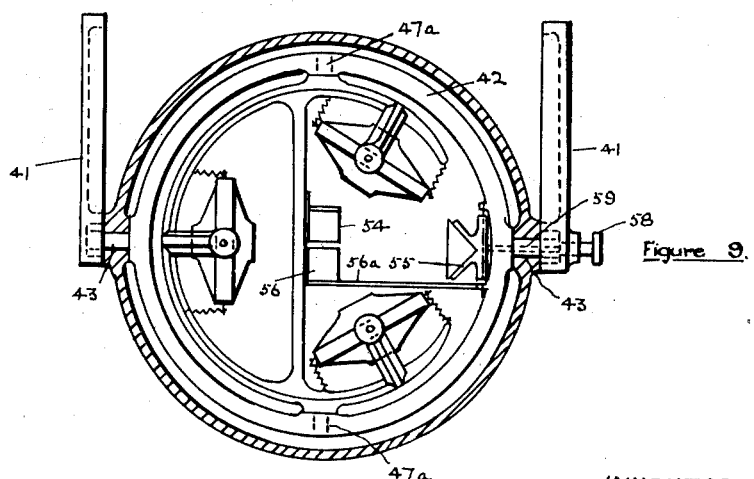

Figs. 5 and 6 show sectional elevation and sectional plan of an arrangement of telescope for use say as a bomb-dropper on air ships or aeroplanes in which the effects of angular motion in two planes have to be annulled, Figs. 7 and 8 show an arrangement of telescope in which three gyros are employed, Fig. 9 shows an arrangement of the optical parts which permits of a hand adjustment, Fig. 10 shows an alternative arrangement, Figs. 11 and 12, 13 and 14, and 15 show alternative arrangements of optical parts which I may employ.

Figs. 1 and 2 show an elevation and plan of a telescope which annuls the effects of angular motion about one axis, for example on board ship it would annul the effects of any angular motion of the ship in the vertical plane containing the line of sight, so that the horizon would always appear stationary in the field of view. The telescope can be trained by hand to view any position of the horizon.

Figs. 3 and 4 show two views of the prisms or reflectors of the telescope used in Figs. 1 and 2.

The base 1 of the telescope is pivotally mounted on the pedestal 2 on the vertical pivot 3. The horizontal shaft or gimbal axis 4 is mounted on ball bearings in the base 1 and carries on one end the fork 5 and on the other end the fork 6 (Figs. 3 and 4). The fork 5 supports a gyroscope 7 on the horizontal trunnion axis 8. The axis of the gyro is vertical and the gyro casing may have gravitational stability about the axis 8 or the gyro casing may be in neutral equilibrium about the trunnion axis 8 but the trunnion axis 8 may be below the axis of the shaft 4, so as to give gravitational stability to the fork 5. The fork 6 carries the reflectors of the telescope which are illustrated as prisms 9 and 10 (Figs. 3 and 4) carried by the plate 11, the plate being attached to the fork 6 by the trunnions 12 which are clamped by the screws 13. The objective 14 and eyepiece 15 of the telescope are attached to a cylindrical sleeve 16 which can turn on the cylindrical projection of a casting 17 which is rigidly attached to the base 1, the cover plate 18 being screwed into the casting 17 and serving to keep the sleeve 16 in position.

The optical parts of the telescope are so arranged that the position of the image on the cross-wires in the eyepiece is not altered by any angular motion of the base 1 or of the sleeve 16 about the axis of the shaft 4. This is attained in the design illustrated when the focal plane and the objective are equidistant from that axis.

Fig. 5 shows a sectional elevation and Fig. 6 a sectional plan of an arrangement of telescope which annuls the effects of angular motion in any plane containing the line of sight which may be used for example in bomb-dropping sights for use on airships or aeroplanes in which the line of sight has to be controlled both fore and aft and athwartships. Figs. 5 and 6 illustrate one method of adapting the telescope for this purpose.

The outer case 20 is supported on the aeroplane on two cylindrical ends 21 which rest in V blocks on the aeroplane in such a position that the axis of the cylindrical ends 21 is athwartships and approximately horizontal. The frame carrying the V blocks may conveniently project from the side of the fuselage of an aeroplane adjacent to the observer's seat. The gimbal ring 22 is carried on the trunnion axis 23 on ball bearings and it carries the gyro 24 on the trunnion axis 25 and also the plate 26 on the trunnion axis 27, both trunnion axes being provided with ball bearings. These two trunnions are interconnected so that they can only turn together in the same sense and with equal velocity. This may be done by one of many suitable mechanisms, such for instance as the two sets of bevel gears 28 and 29. The plate 26 carries the telescope reflectors which are illustrated by the prisms 30 and 31. The objective 33 and eyepiece 32 are attached to the outer case 20.

The gyro 24 has its rotor axis vertical and is preferably mounted so that it has gravitational stability about the trunnion axis 25, and the telescope looks vertically downward when the rotor axis is vertical.

The sight setting for bomb-dropping is obtained by means of the two mirrors 34 and 35. The mirror 34 is fixed to the outer casing 20 opposite the objective 33 and the mirror 35 is pivotally mounted on an axis 36 which is turned by the lever 37, the position of the lever being indicated by the scale 38. The telescope views the image of the landscape below which is formed by double reflection in the mirrors 34 and 35, and by angling the mirror 35 any portion of the landscape from vertically underneath to the horizon ahead, may be viewed.

The objection to employing one gyrosope having gravitational stability for stabilizing a line of sight in two planes at right angles is that if the mechanism is subjected to accelerations in one plane the deviations produced on the line of sight are in the other plane, for example a change of course in the horizontal plane would produce a deviation in the fore and aft vertical plane. In some cases this may be objectionable and it may be preferable to have the deviations occurring in the plane of the acceleration instead of perpendicular to it. In such cases I may employ the well known arrangement of gyroscopic pendulum which employs two constrained gyroscopes to lengthen the period of oscillation in each plane to be stabilized. I preferably employ however an arrangement of three constrained gyroscopes with their rotor axes making 120° with each other. This is illustrated in Figs. 7 and 8. Fig. 7 shows a sectional elevation in which the gyros have been omitted for clearness of diagram and Fig. 8 shows a sectional plan.

The outer case 40 is supported by the two brackets 41 and the outer gimbal ring 42 is mounted on ball bearings on the trunnions 43, the inner gimbal ring 47 being similarly mounted on the trunnions 47ª which are attached to the outer gimbal ring 42. The inner gimbal ring 47 carries three forks 44, which serve to pivot the cases of the three gyros 45, the motion of each gyro round its vertical pivots being constrained by two springs 46. The plate 48 is attached to the inner gimbal ring 47 by three arms and carries the telescope reflectors which are shown as two prisms 49 and 50. The inner gimbal ring has gravitational stability imparted to it by the ring weight 51. The objective 52 and eyepiece 53 of the telescope are carried by the outer case 40.

A telescope of this type which stabilizes the line of sight in two planes would be very useful on board a warship for obtaining the rate of change of bearing of an enemy for use in fire control. The yawing and rolling effects of the ship being annulled only the change of bearing is left to be observed through the telescope. In order to measure it I may arrange the telescope to take the form which is illustrated in Figs. 5 and 6, for a bomb-dropping sight. The whole apparatus would be mounted on a frame so that the axis of the cylindrical trunnions 21 is vertical. The gyro in this case would preferably be in neutral equilibrium. The motion of the mirror 35 required to keep the enemy ship on the cross wires gives the change of bearing. The adjustment for keeping the enemy ship on the cross wires may however be more conveniently made by moving one or more of the internal reflectors of the telescope thus reducing the total number of reflectors. Such an arrangement is illustrated in Fig. 9. The outer case 40 is carried by the brackets 41 and the outer gimbal ring 42 is pivotally mounted on the trunnions 43, the inner gimbal ring being pivotally supported on the outer gimbal ring on the trunnions 47ª as in Figs. 7 and 8. The inner gimbal ring also carries three gyros as above. The inner gimbal ring only carries one reflector 54 the other three, the double reflector 55 and single reflector 56 being carried by the outer gimbal ring. Another view of the arrangement of the optical parts is illustrated in Figs. 13 and 14. The reflector 56 is attached to the outer gimbal ring by the bracket 56ª, and the double reflector 55 is pivotally mounted on the gimbal ring on the axis 57 about which it can be turned by means of the screw 58 which moves a push rod 59 through the trunnion 43. By turning 58 the target can be kept on the cross wires and the motion of 58 gives the change of bearing.

In this particular arrangement of optical parts the two trunnion axes 43 and 47ª cannot be in the same plane. This arises from the fact that all the reflectors are stabilized about the axis 43 but only the reflector 54 is stabilized about the axis 47ª.

Fig. 10 shows another arrangement of the reflectors used in Fig. 9 which allows of the two trunnion axes being in the same plane and also provides a hand adjustment for use in determining the rate of change of bearing or in bomb-dropping sights or in general for making angular measurements from a moving platform. Fig. 10 may be looked upon as a horizontal section of the instrument of which Fig. 9 represents a vertical section but has some small changes in the method of supporting the reflectors. The reflector 54 is rigidly attached to the inner gimbal ring 47 and the reflector 56 is pivotally mounted on the inner gimbal ring on a central pivot coaxial with the trunnion 47ª (Fig. 9). The mirror 56 is turned about this pivot by means of the screw 58 actuating the push rod 59, the bell crank 59ª and the arm 56ª which is rigidly attached to the mirror 56. A spring 59ᵇ serves to keep the several parts in contact. The double reflector 55 is pivotally mounted on the outer gimbal ring 42 on the axis 57 the angular motion about this axis being controlled by the deflecting arm 55ª, which is rigidly connected to the reflectors 55, and the connecting rod 55ᵇ which links the arm 55ª to the inner gimbal ring in such a manner that when the outer case oscillates about the trunnion axis 47ª or about the trunnion axis 43 around the stabilized inner gimbal ring 47, the image of the target remains stationary on the cross wires. The two trunnion axes 43 and 47ª are in a plane and intersect in the centre of the instrument.

Alternative arrangements of optical parts are illustrated in Figs. 11 and 12, in Figs. 13 and 14 and in Fig. 15.

In Fig. 11 the beam passes from the external object through the objective 60 then through a deflecting prism 61, then through the inverting prism 62 which also turns the image right for left, an end view of the prism being shown in Fig. 12. The image formed in the focal plane is examined through the eyepiece 63. The prism 62 is stabilized and all the other parts move with the ship. The deflecting prism 61 is moved along the beam to keep the target on the cross wires.

In Fig. 13 the beam passes through the objective 60 is then reflected at right angles by the reflector 56, is then doubly reflected by the prisms 55 and then singly reflected by the reflector 54 to the eyepiece 63. A side view of the three reflecting prisms is shown in Fig. 14. All three prisms 54, 55 and 56 may be stabilized, in which case the arrangement is equivalent to that illustrated in Figs. 2, 3 and 4. Alternatively only one prism say 54 may be stabilized and the other two may move with the objective and eyepiece as illustrated in Fig. 9 or 54 may be stabilized and 55 partially stabilized as illustrated in Fig. 10.

Fig. 15 shows an arrangement employing lenses only. The objective 60 forms an inverted image 64 of the external object which is reinverted at 65 by the lens or system of lenses 66, the image 65 being viewed through the eyepiece 63.

The lens system 66 alone is stabilized, all the others moving with the ship, aeroplane, or moving platform. For example the gyro trunnion 67 may carry a crank 68 on which the lens 66 is fixed or if a hand adjustment is required the crank 68 may only carry a crank pin 69 which engages with a slot in another equal crank 68ª, which turns on an axis 67ª coaxial with the gyro trunnion, then by moving the axis 67ª up and down relatively to 67 a hand adjustment is provided for keeping the target on the cross wire and compensating for the straying of the gyro.

Having particularly described and ascertained the nature of my said invention and in what manner the same is to be performed, I declare that what I claim is:—

1. A telescope adapted for use upon a moving platform such as a ship or the like, comprising a casing carrying some of the optical parts of the telescope and partaking of the angular movement of the platform, and a gyroscope for stabilizing the remaining optical parts of the telescope to compensate for the effect of the angular movement of the platform.

2. A telescope adapted for use upon a moving platform such as a ship or the like, comprising a casing carrying some of the optical parts of the telescope and partaking of the angular movement of the platform, and gyroscopic means connected to the remaining optical parts for causing the image of an object to remain in fixed relation to a predetermined point of the field of view irrespective of such angular movement.

3. A telescope adapted for use upon a moving platform such as a ship or the like, comprising a casing carrying the eyepiece and cross wires of the telescope and partaking of the angular movement of the platform, a gyroscope, and connections between the gyroscope and the remaining optical parts of the telescope for causing the image of an object to remain stationary relative to the cross wires irrespective of the angular movement of the platform.

4. A telescope adapted for use upon a moving platform such as a ship or the like, comprising a casing carrying some of the optical parts of the telescope and partaking of the angular movement of the platform, means for stabilizing the remaining optical parts of the telescope to compensate for the effect of the angular movement of the platform, and means mounted on the casing whereby the angle between two objects viewed by the telescope may be measured.

5. A telescope adapted for use upon a moving platform such as a ship or the like, comprising a casing carrying some of the optical parts of the telescope and partaking of the angular movement of the platform, means for stabilizing the remaining optical parts of the telescope to compensate for the effect of the angular movement of the platform, means mounted on the casing for permitting the angle between two objects to be measured, including a mirror fixed on the casing in alinement with the optical parts carried thereby, a second mirror rotatably mounted on the casing and a scale associated with the second mirror whereby its angular movement may be determined.

6. A telescope adapted for use upon a moving platform such as a ship or the like, comprising a casing carrying some of the optical parts of the telescope and partaking of the angular movement of the platform, a member upon which the remaining optical parts are mounted and means for stabilizing the member comprising three gyroscopes mounted on the member and having their rotor axes arranged at substantially 120° to each other.

7. A telescope adapted for use upon a moving platform such as a ship or the like, comprising a casing carrying some of the optical parts of the telescope and partaking of the angular movement of the platform, and means for stabilizing the remaining optical parts of the telescope comprising a gimbal ring mounted on the casing and carrying some of the optical parts, a second gimbal ring mounted on the first gimbal ring and carrying other optical parts, and a plurality of gyroscopes symmetrically mounted upon the second gimbal ring.

8. A telescope adapted for use upon a moving platform such as a ship or the like, comprising a casing carrying some of the optical parts of the telescope and partaking of the angular movement of the platform, and means for stabilizing the remaining optical parts of the telescope comprising a gimbal ring mounted on the casing and carrying some of the optical parts, a second gimbal ring mounted on the first gimbal ring and carrying other optical parts, a plurality of gyroscopes symmetrically mounted upon the second gimbal ring, and means whereby the optical parts carried on the gimbal rings may be adjusted from the exterior of the casing.

9. In an apparatus of the type described, an observation instrument mounted on a body subject to angular variations of position, a prism system in optical relation to the observation instrument, gyroscopic means for stabilizing the prism system and means for connecting said prism system and said gyroscopic means whereby relative motion between said gyroscopic means and said body is communicated to said prism system.

10. In an optical instrument adapted for use on an angularly movable platform and including a prism system, a gyroscope and a connection between the prism system and the gyroscope for compensating for the effect of movement of the platform upon the image of the object in the field of view of the instrument.

11. An optical instrument adapted for use on an angularly movable platform and including a prism system, a gyroscope and a connection between the prism system and the gyroscope for moving the prism system through an angle corresponding to the angle of movement of the platform to compensate for the effect of the movement of the platform upon the image of the object in the field of view of the instrument.

12. In an apparatus of the type described, an observation instrument mounted on a body subject to angular variations of position, a member having a reflecting surface in optical relation to the observation instrument, gyroscopic means for stabilizing the member and means for connecting the member and the stabilizing means whereby relative motion between the stabilizing means and the body is communicated to the member.

13. An optical instrument adapted for use on an angularly movable platform comprising a casing carrying a telescope and partaking of the movement of the platform, a member having a reflecting surface and movably mounted on the casing, a stabilizing device free from forced oscillations in phase with the disturbing forces introduced by the oscillations of the body movably mounted on the casing and an adjustable connection between the device and the member for compensating for the effect of movement of the platform.

14. The combination with an observation instrument of a body subject to angular variations of position comprising a telescope attached to said body, a frame for holding an optical system in optical relation to said telescope, a gimbal joint for suspending said frame from the body and gyroscopic stabilizing elements acting on said gimbal joint at right angles whereby the angular position of said frame is changed in accordance with the angular variation of the position of said body.

15. An optical instrument for use on an angularly moving body comprising optical elements adapted to partake of the angular movement of the body, an optical element mounted to move relatively to the body, a stabilizing device free from forced oscillations in phase with the disturbing forces introduced by the oscillations of the body and connections between the device and the optical element for moving the element relatively to the body to compensate for the effect of the angular movement thereof on the field of view of the instrument.

16. An optical instrument for use on an angularly moving body comprising optical elements adapted to partake of the angular movement of the body, an optical element mounted to move relatively to the body, a gyroscope and connections between the gyroscope and the optical element for moving the element relatively to the body to compensate for the effect of the angular movement thereof on the field of view of the instrument.

17. An optical instrument for use on an angularly moving body comprising optical elements adapted to partake of the angular movement of the body, an optical element mounted to move relatively to the body, a gyroscope and connections between the gyroscope and the optical element for communicating to said element in a definite proportion the relative movement between the gyroscope and the body.

18. In an optical instrument for use on an angularly moving body, the combination of a member adapted to partake of the angular movement of the body, optical elements of the instrument mounted upon the member, an optical element mounted for movement relatively to the member, a stabilizing device free from forced oscillations in phase with the disturbing forces introduced by the oscillations of the body and connections between the device and the optical element for compensating for the effects of angular motion of the body on the field of view of the instrument.

19. An optical instrument for use on an angularly moving body comprising optical elements adapted to partake of the angular movement of the body, a member having a reflecting surface in optical relation to said elements, a gyroscope and connections between the member and the gyroscope for moving the member relatively to the body to compensate for the effects of the angular movement thereof on the field of view of the instrument.

20. An optical system having a plurality of optical parts arranged to nullify the effect thereon of extraneous oscillatory movement, said parts being angularly adjustable with respect to each other in a horizontal plane, and a gyroscope for controlling the angular adjustment.

21. An optical system comprising a plurality of optical parts arranged to nullify the effect thereon of extraneous oscillatory movement and a gyroscope controlling a part of said optical system.

22. An optical instrument for use on an angularly moving body, comprising a casing adapted to partake of the angular movement of the body, optical elements adjustably mounted on the casing, an optical element associated with the casing and mounted to move relatively thereto, a gyroscope and connections between the optical element and the gyroscope for moving the element relatively to the casing to compensate for the effect of the angular movement of the body on the field of view of the instrument.

23. An optical instrument for use on an angularly moving body, comprising a casing adapted to partake of the angular movement of the body, and provided with a projection, a member movably mounted on the projection and carrying some of the optical elements of the instrument, an optical element movably mounted with respect to the casing, a gyroscope, means for mounting the gyroscope upon the casing for movement about mutually perpendicular axes and connections between the optical element and the mounting means for moving the element relatively to the casing to compensate for the effect of the angular movement of the body on the field of view of the instrument.

Dated this 10th day of December 1915.

JAMES BLACKLOCK HENDERSON.